Dec. 11, 1928.   1,694,574
W. D. WITTER ET AL
MOTOR FIRE APPARATUS
Filed Aug. 10, 1925   2 Sheets-Sheet 2
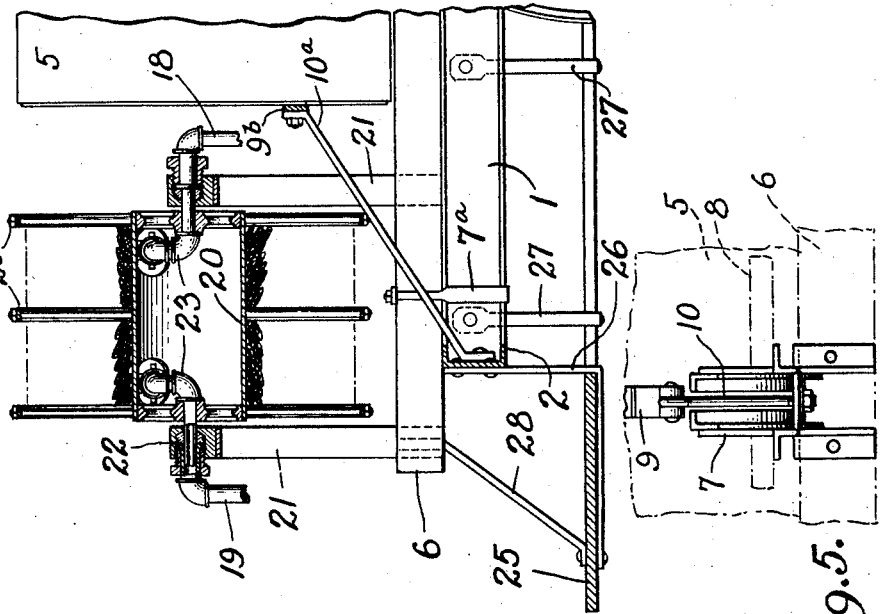
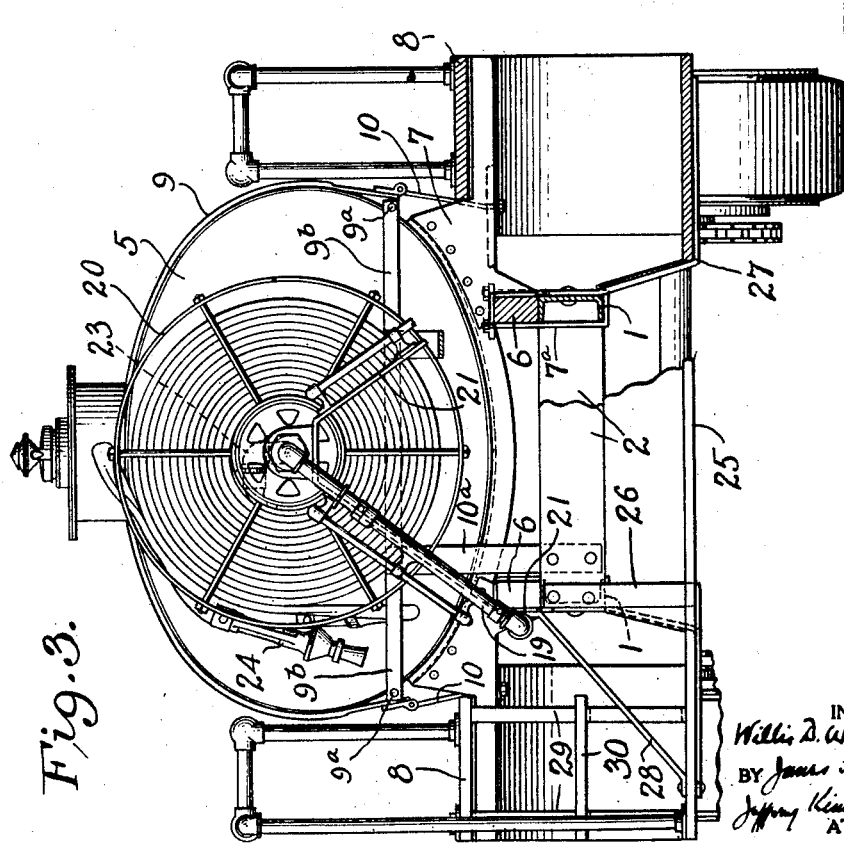
INVENTORS
Willis D. Witter and
BY James H. Harte
ATTORNEY Patented Dec. 11, 1928.

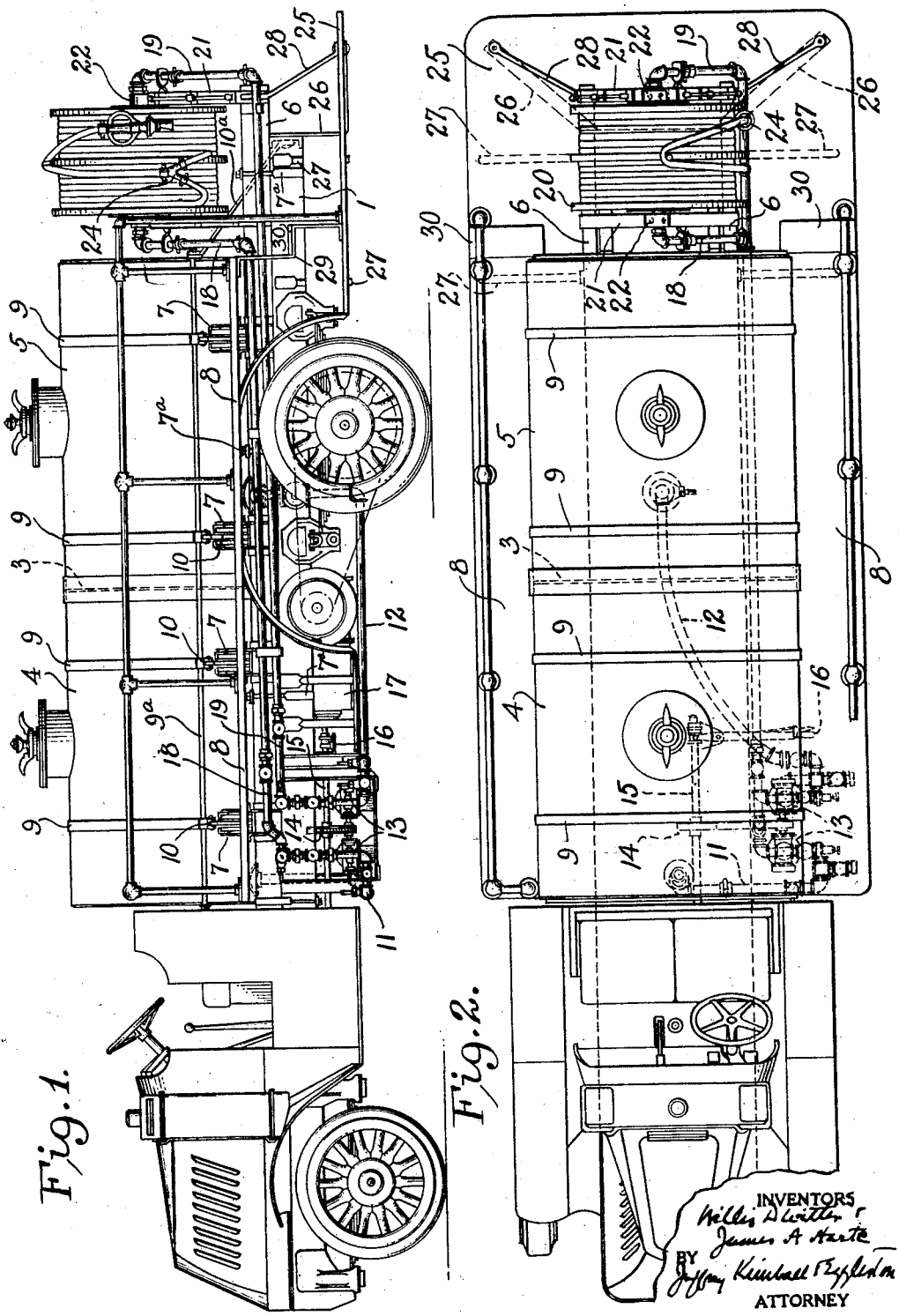

1,694,574

UNITED STATES PATENT OFFICE.

WILLIS D. WITTER AND JAMES A. HARTE, OF UTICA, NEW YORK, ASSIGNORS, BY MESNE ASSIGNMENTS, TO AMERICAN LA FRANCE AND FOAMITE CORPORATION, A CORPORATION OF NEW YORK.

MOTOR FIRE APPARATUS.

Application filed August 10, 1925. Serial No. 49,234.

The invention relates to motor-propelled, foam-producing fire apparatus and its object is to produce a practical combination of foam-producing instrumentalities with the chassis of a motor vehicle or truck so as to produce a complete, portable and large size foam system capable of being speedily and also safely driven to the place of fire and having facilities for extremely prompt and convenient operation for the production of foam on arrival.

The invention is illustrated in the accompanying two sheets of drawings in its preferred form.

Fig. 1 is a side elevation.

Fig. 2 a plan view,

Fig. 3 a rear elevation partly in section and on a larger scale,

Fig. 4 a longitudinal section of the rear projecting structure, and

Fig. 5 a detail of a cross-bolster.

The fire fighting equipment is built into or upon a standard automobile or truck chassis, which comprises two side girders marked 1 and a number of cross-girders marked 2, together forming a main frame which carries the propelling engine and driver at its forward end, as usual, and is itself carried by means of springs on front and rear automotive axles. The chassis shown is a standard type and any other equivalent type can be used with this invention in its place.

The fire fighting apparatus comprises a main tank shell of elliptical cross-section divided by a transverse partition 3 into two tank compartments arranged one in front of the other and marked 4 and 5 respectively, each compartment being provided with a manhole and vent cover at its top as indicated in the drawing. The tank compartments 4 and 5 are respectively the containers for the acid and basic solutions, which when brought together produce the fire-extinguishing foam as will be understood. These solutions constitute by far the greater part of the load on the vehicle; the elliptical shape is for the purpose of giving a low center of gravity for this load.

The tank structure is directly carried on a sub-frame which comprises two longitudinal beams 6, which may be wooden, and are superposed upon the two side girders 1 and project rearwardly therefrom. They are connected to the main side girders 1 at intervals, by means of loop clamps $7^a$ or equivalent forms of attachment, and are also joined and spaced by four cross-bolsters, the upper contours of which are curved elliptically to receive the correspondingly curved tank bottom. These bolsters extend laterally and horizontally from the sub-frame beams 6 and form supports for the shelf platforms 8. For this purpose the bolsters may be constructed of assembled angle shapes and pressings as indicated in the drawings, or may be otherwise designed as preferred. The shelf platforms 8 are thus mounted above the rear vehicle wheels where they can be coextensive in length with the tank shell, and provide an easy means of access to the manhole covers; they are provided with hand rails. The tank shell is securely held to the bolsters by the straps 9, the ends of which are provided with eye-bolts 10 appropriately connected to the bolsters, as will be apparent, and serving to tighten the tank structure to the latter. The tank is further secured to the bolsters and vehicle chassis by the longitudinal tie-rods $9^a$, cross bars $9^b$ and oblique braces $10^a$, which latter extend from the rear cross bar $9^b$ to the rear cross member 2 of the main chassis frame. As thus mounted and secured, the tank structure is situated in a forward position on the chassis frame so that the front bulkhead of the forward compartment is directly behind the driver's seat.

The solutions are withdrawn from the bottoms of the two tank compartments through pipes marked 11 and 12 respectively (Fig. 2) and by means of two rotary pumps 13 driven by chain 14 from a lay shaft 15. The latter is provided with a clutch and clutch lever 16 by means of which the pumps can be operatively connected when desired with the usual transmission gearing of the motor vehicle. The casing of the transmission gearing appears at 17 in Fig. 1 and it will be observed that the entire pump mechanism is constructed as a unit and situated below the tank structure, where it is easily accessible. The present invention is not concerned with the style of pumps or their operating mechanism, which may be designed and mounted in any suitable way, but the pumps are in any event power driven, preferably by the propelling engine, and located below the tank. The piping connections therefor include the usual valves and by-passes and are arranged to deliver the two solutions from the pumps through longitudinal pipes such as indicated at 18 and 19 to the drum 20 of a twin-hose reel. According to this invention, this reel is placed in rear of the rear tank compartment instead of directly behind the driver's seat, as formerly. This position has the advantage that it allows a larger part of the weight of the heavy solutions to be borne by the front vehicle wheels and thus gives a better distribution of weight and greater safety for fast driving and short turns; it also permits the rear projecting reel structure to be of lighter design than would otherwise be required, thereby saving expense, and it further affords greater convenience in use, because the rear projecting frame structure can be backed, when necessary, over a sidewalk and thus brought closer to a building entrance than would otherwise be possible, and an adequate rear platform can also be provided so that the twin reel is very assessible for unwinding and replacing the hose. While these advantages would be obtained to some extent if the reel were mounted to rotate on a transverse axis, it is preferred to arrange it on a longitudinal axis, substantially coinciding with the central axis of the tank compartments. For this purpose the reel is journalled, front and rear, in two stanchions 21 mounted on the rear projecting ends of the sub-frame beams 6. The stanchions are inverted V-brackets and carry stuffing boxes and drum bearings 22 at their upper ends, through which the pipe conduits 18 and 19 are respectively extended into the interior of the drum 20, wherein they are connected to the elbow connections 23. The two lines of hose of the twin reel are respectively connected to the ends of the elbows 23 and project through the cylindrical wall of the drum. The drum can thus rotate, on a longitudinal axis, with reference to the stanchions while maintaining a tight solution connection between each of its hose lines and the solution delivery pipes 18 and 19.

The two hose lines are connected together by a Y-coupling 24 (Fig. 1) where the two solutions first come in contact and from which the mixed and mixing solutions flow through the single foam pipe to the nozzle. By the construction described the twin hose can be drawn off rapidly and easily from the reel in either direction and, being permanently connected to the pumps through the swivelled reel as above described, is instantly ready for use without the need of making special couplings.

The rear platform 25 is mounted below and around the reel stanchions, being supported by brackets 26 and 27 projecting from the chassis frame and also braced and strengthened by the oblique hangers 28 connected to the extreme rear ends of the sub-frame beams 6. The space beneath the reel is thus available for a chest, not shown, for storage of tools and supplies without encroaching on the platform space. The rear platform 25 is further tied and braced to the sub-frame by means of the brackets 29, which brackets also form the support for the step 30, by means of which access is had from the rear platform to the upper side platforms.

We claim—

1. A motor-propelled foam fire-extinguishing apparatus comprising in combination with a motor vehicle chassis, a two-compartment tank structure secured thereon with its center of gravity in advance of the rear wheels of the vehicle, a twin hose reel mounted in rear of said structure, a power driven pump, pipe lines connecting the tank compartments, pump and hose and a step platform depending from the chassis and extending beyond the side and end of the hose reel to provide access thereto either from the sides thereof or the rear end of the vehicle.

2. A motor-propelled foam fire extinguishing apparatus as claimed in claim 1 in which the hose reel is mounted substantially co-axially with said tank structure.

In testimony whereof, we have signed this specification.

WILLIS D. WITTER.
JAMES A. HARTE.